US011810738B2

(12) United States Patent
Tomiyama et al.

(10) Patent No.: US 11,810,738 B2
(45) Date of Patent: Nov. 7, 2023

(54) INPUT DEVICE EMPLOYING A FLEX SENSOR AND A SWITCH OUTPUTTING FIRST AND SECOND SIGNALS

(71) Applicant: ALPS ALPINE CO., LTD., Tokyo (JP)

(72) Inventors: Tatsuhiro Tomiyama, Miyagi (JP); Takeaki Maehata, Miyagi (JP); Yoshihiro Hashimoto, Miyagi (JP); Yukio Miura, Tokyo (JP); Kazunari Takahashi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 406 days.

(21) Appl. No.: 17/333,253

(22) Filed: May 28, 2021

(65) Prior Publication Data

US 2021/0287862 A1    Sep. 16, 2021

Related U.S. Application Data

(63) Continuation of application No. PCT/JP2019/050698, filed on Dec. 24, 2019.

(30) Foreign Application Priority Data

Jan. 17, 2019 (JP) .................................. 2019-006405

(51) Int. Cl.
G06F 3/0362    (2013.01)
H01H 21/24    (2006.01)
(Continued)

(52) U.S. Cl.
CPC .............. *H01H 21/24* (2013.01); *B60K 37/06* (2013.01); *H01H 21/04* (2013.01); *G06F 3/0362* (2013.01)

(58) Field of Classification Search
CPC ........ B60K 37/06; G06F 3/0362; H01H 21/24
See application file for complete search history.

(56) References Cited

U.S. PATENT DOCUMENTS 5,666,138 A * 9/1997 Culver .................. G06F 3/0362
345/157
6,618,037 B2    9/2003 Sakamaki et al.
(Continued)

FOREIGN PATENT DOCUMENTS

CN        1619740        5/2005
CN      106057537       10/2016
(Continued)

OTHER PUBLICATIONS

International Search Report for PCT/JP2019/050698 dated Feb. 10, 2020.
Office Action for CN201980084077.2 dated Apr. 28, 2023.

*Primary Examiner* — Vanessa Girardi
(74) *Attorney, Agent, or Firm* — IPUSA, PLLC

(57) ABSTRACT

An input device includes an manipulating part, a movable member fixed to the manipulating part and having a rotating shaft, a fixing member configured to rotatably support the rotating shaft so that the movable member is rotatable, a flex sensor disposed on the manipulating part and configured to detect flexing of the manipulating part, a switch disposed on the movable member or the fixing member, pressed by a rotating operation of the movable member, and configured to switch between an on state and an off state when a flexing amount of the manipulating part reaches a predetermined amount, and a signal processor configured to output a control signal, based on a first output signal of the flex sensor, and a second output signal of the switch.

15 Claims, 12 Drawing Sheets

(51) Int. Cl.
*B60K 37/06* (2006.01)
*H01H 21/04* (2006.01)

(56) References Cited

U.S. PATENT DOCUMENTS

| 7,465,890 B2 | 12/2008 | Yamasaki et al. |
| 2006/0054479 A1 | 3/2006 | Iisaka et al. |

FOREIGN PATENT DOCUMENTS

| JP | H10-260097 | 9/1998 |
| JP | 2002-007065 | 1/2002 |
| JP | 2004-164929 | 6/2004 |
| JP | 2005-63936 | 3/2005 |
| JP | 2008-257296 | 10/2008 |
| JP | 2010-244858 | 10/2010 |
| JP | 2011-34796 | 2/2011 |
| JP | 2011-238061 | 11/2011 |

\* cited by examiner

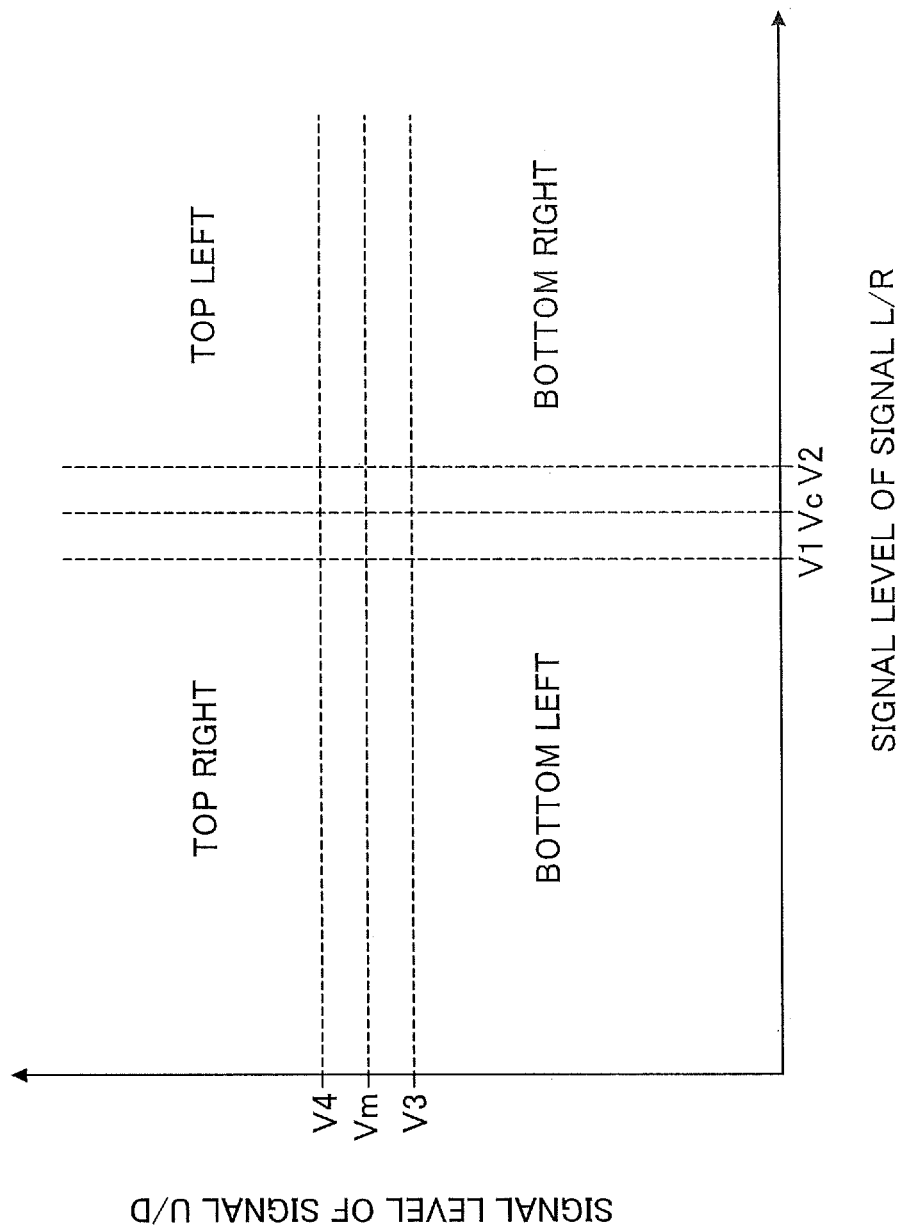

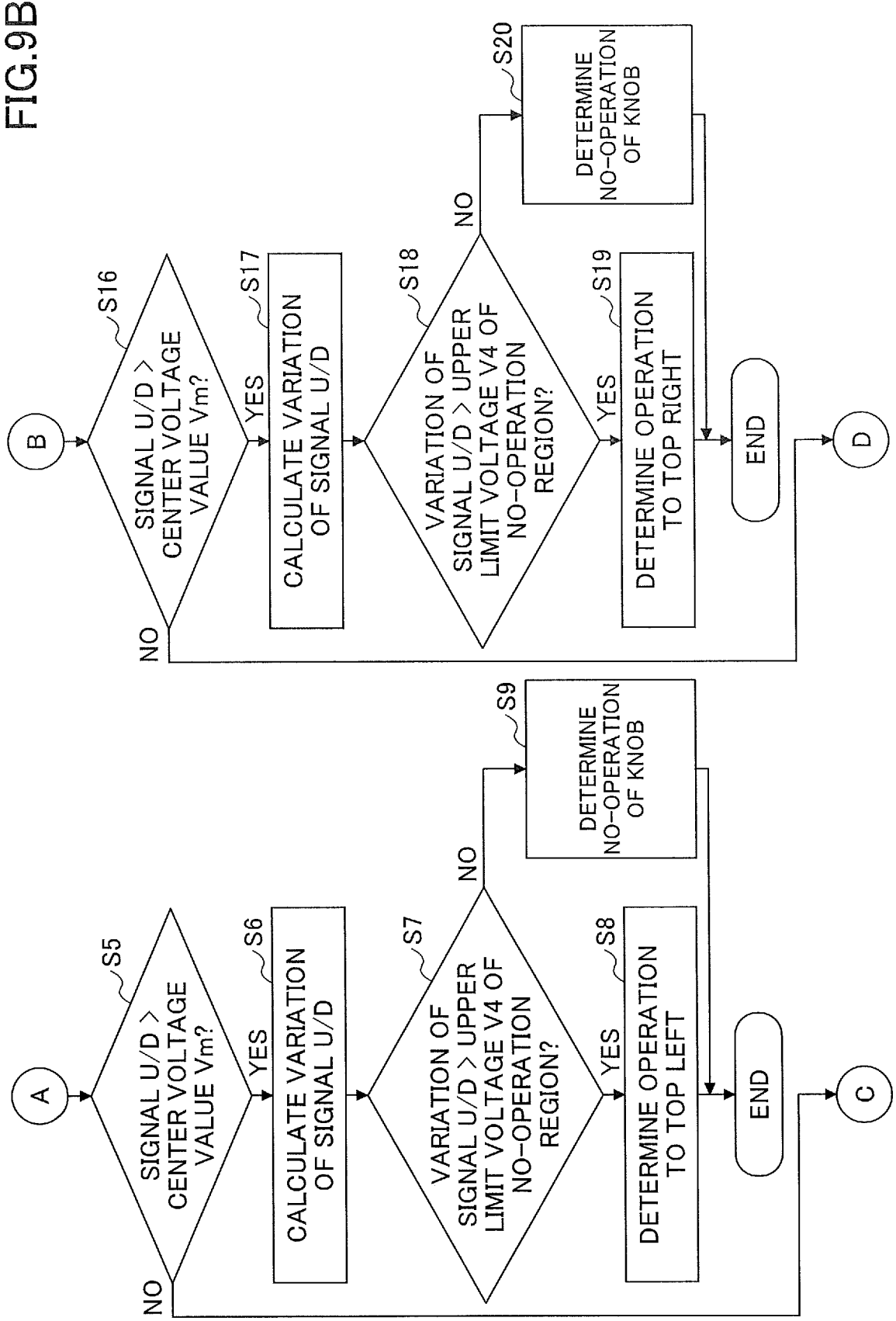

INPUT DEVICE EMPLOYING A FLEX SENSOR AND A SWITCH OUTPUTTING FIRST AND SECOND SIGNALS

CROSS REFERENCE TO RELATED APPLICATIONS

This application is a continuation application of International Application No. PCT/JP2019/050698 filed on Dec. 24, 2019 and designated the U.S., which is based upon and claims priority to Japanese Patent Application No. 2019-006405, filed on Jan. 17, 2019, the entire contents of each of which are hereby incorporated by reference.

BACKGROUND

1. Technical Field

The present disclosure relates to input devices, and operation units.

2. Description of the Related Art

Conventionally, there is a load sensor which has a small size, and is formed by an elastic plate having two pairs of strain gauges, and a fixing portion at a center, and is configured to be pressed by a flat manipulation body via an elastic member that is disposed on a circumference around the fixing portion, so that a direction and a magnitude of an output signal is adjustable according to a pressed position and a displacement of the flat manipulation body, as proposed in Japanese Laid-Open Patent Publication No. H10-260097, for example.

The conventional load sensor outputs a signal indicating a direction according to a manipulated direction, but outputs no other signals.

SUMMARY

Accordingly, one object according to embodiments of the present disclosure is to provide an input device and an operation unit, which output signals indicating a manipulated direction, and on and off states according to a manipulated amount.

According to one aspect of the embodiments of the present disclosure, an input device includes an manipulating part; a movable member fixed to the manipulating part and having a rotating shaft; a fixing member configured to rotatably support the rotating shaft so that the movable member is rotatable; a flex sensor disposed on the manipulating part and configured to detect flexing of the manipulating part; a switch disposed on the movable member or the fixing member, pressed by a rotating operation of the movable member, and configured to switch between an on state and an off state when a flexing amount of the manipulating part reaches a predetermined amount; and a signal processor configured to output a control signal, based on a first output signal of the flex sensor, and a second output signal of the switch.

Other objects and further features of the present invention will be apparent from the following detailed description when read in conjunction with the accompanying drawings.

BRIEF DESCRIPTION OF THE DRAWINGS

FIG. 8 is a diagram illustrating a manipulated direction of the knob 130 determined by a signal L/R and a signal U/D.

FIG. 9B is a flow chart illustrating the process of the determination unit 161 of the signal processor 160, determining the manipulated direction of the knob 130.

DETAILED DESCRIPTION

Hereinafter, embodiments applied with the input device and the operation unit according to the present invention will be described.

Embodiment

Figure 1:
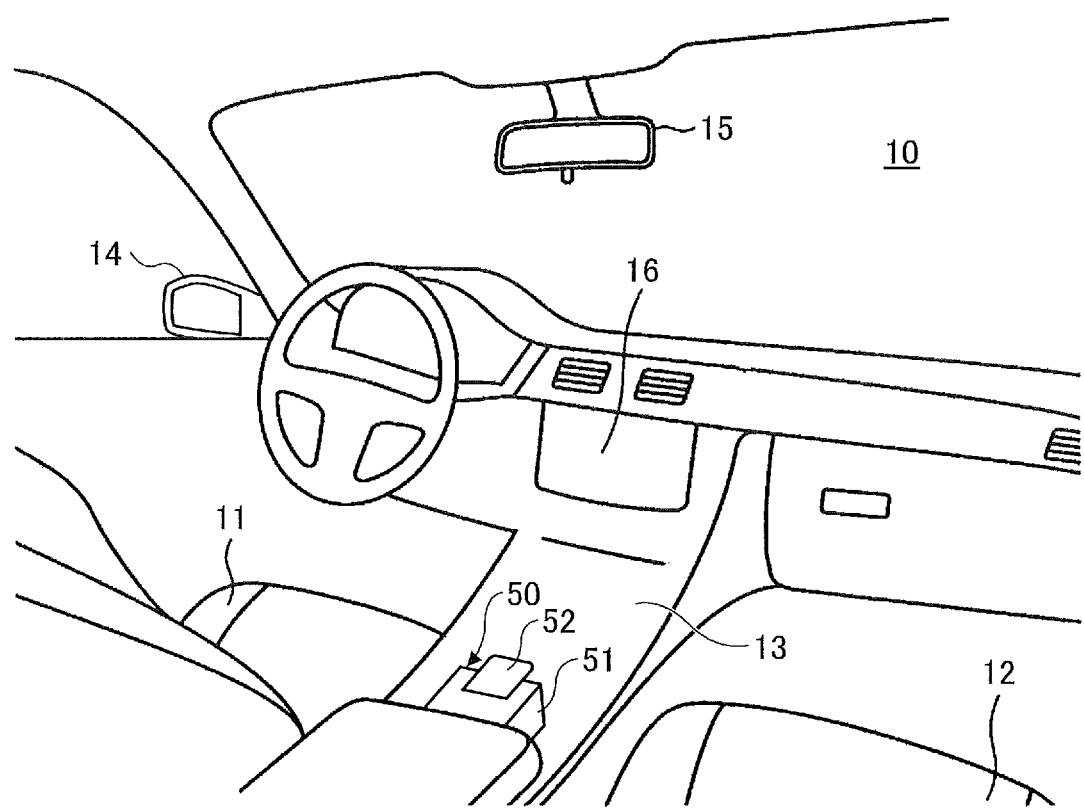
FIG. 1 is a diagram illustrating an interior of a vehicle 10 mounted with an operation unit 50 according to one embodiment.

FIG. 1 is a diagram illustrating an interior of a vehicle 10 mounted with an operation unit 50 according to one embodiment. The vehicle 10 includes a driver's seat 11, a passenger's seat 12, a center console 13, an outer mirror 14, an inner mirror 15, and a display 16. The operation unit 50 is provided on the center console 13, disposed in the interior of the vehicle 10, between the driver's seat 11 and the passenger's seat 12. The operation unit 50 includes a main body 51, and a knob 52.

The operation unit 50 is provided for operating various devices of the vehicle 10, and may be used to adjust the outer mirror 14 and the inner mirror 15, for example. When a user manually bends the knob 52 in an up-and-down direction and a left-and-right direction, the outer mirror 14 and the inner mirror 15 can be adjusted in the up-and-down direction and the left-and-right direction.

Figure 2:
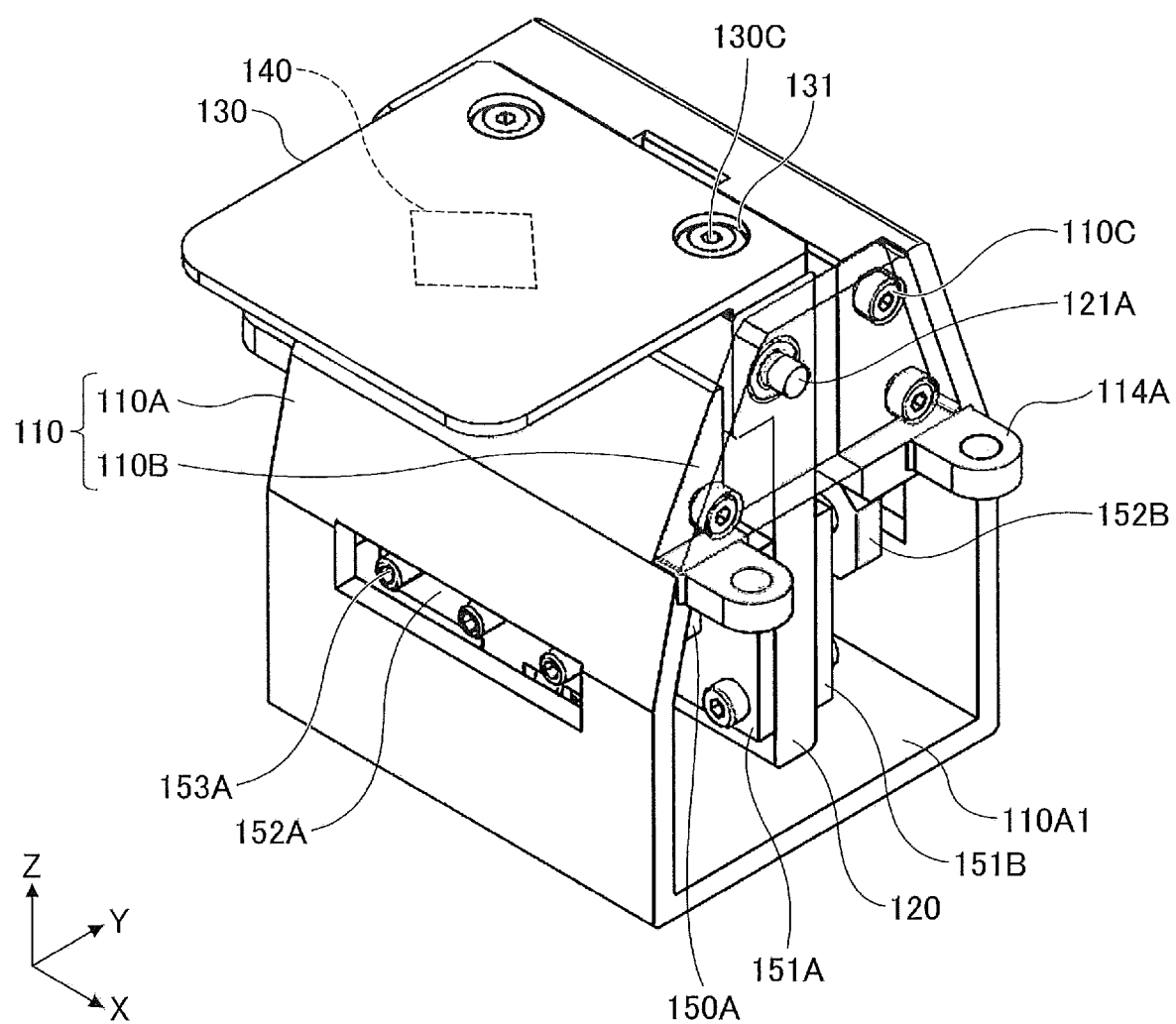
FIG. 2 is a diagram illustrating an input device 100 according to one embodiment.

FIG. 2 is a diagram illustrating an input device 100 according to one embodiment. The input device 100 is accommodated inside the operation unit 50 of FIG. 1. The input device 100 includes a housing 110, a lever 120, a knob 130, a flex sensor 140, push switches 150A and 150B, substrates 151A and 151B, holders 152A and 152B, and pins 153A and 153B, as main constituent elements. In FIG. 2, a portion of the housing 110 (wall 110B) is illustrated in a perspective.

The XYZ coordinate system will be defined and described in the following. For the sake of convenience, a negative Z-axis direction is referred to as a lower side or downward, and a positive Z-axis direction is referred to as an upper side or upward in the following description, however, the upper side and the lower side do not represent a universal up-and-down relationship. In the vehicle 10 illustrated in FIG. 1, a forward direction is a −Y-direction, a rear direction is a +Y-direction, a left direction is a +X-direction, a right direction is a −X-direction, the upper direction is a +Z-direction, and the downward direction is a −Z-direction.

Figure 3:
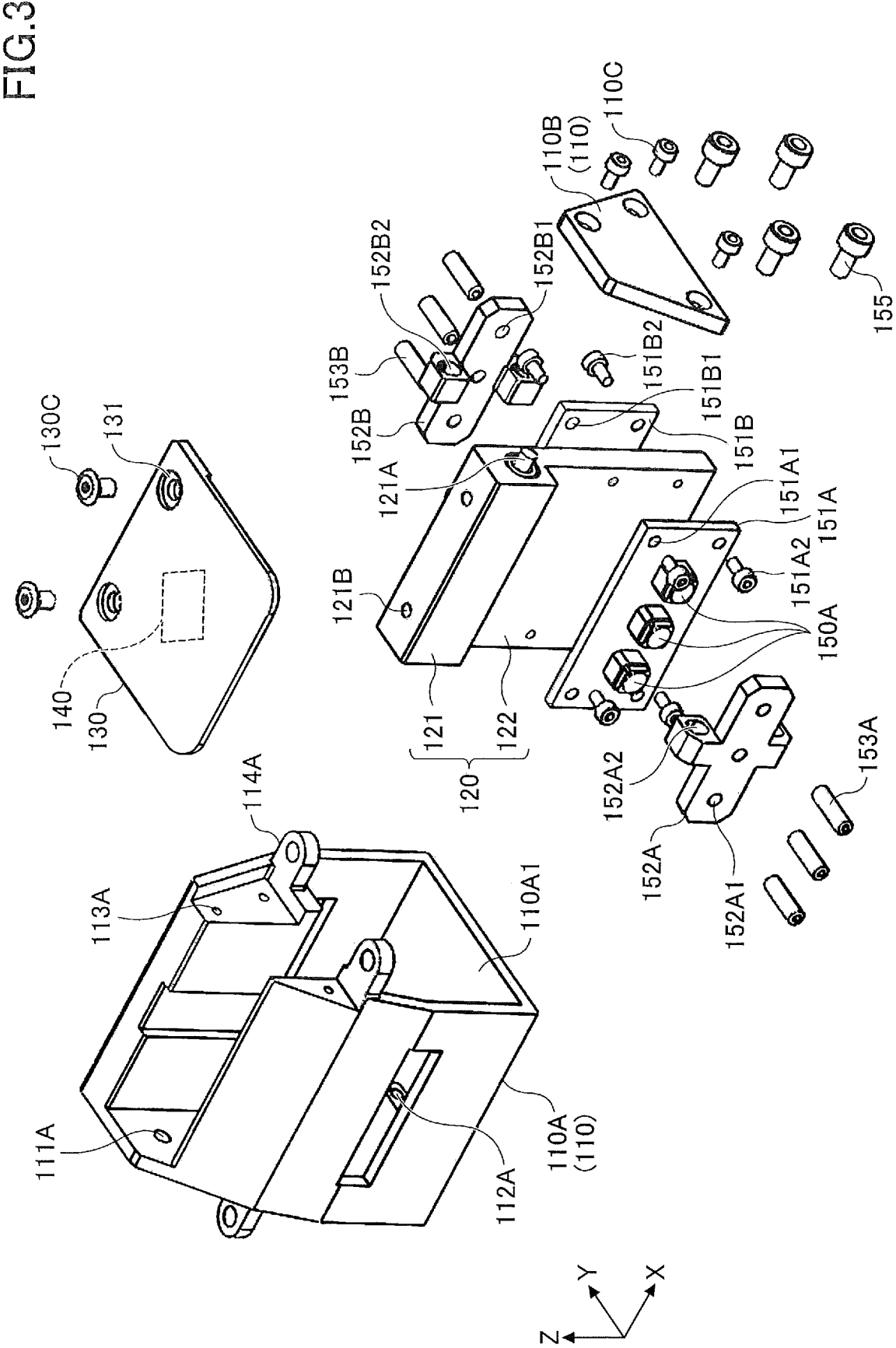
FIG. 3 is an exploded view illustrating the input device 100 according to one embodiment.
Figure 4:
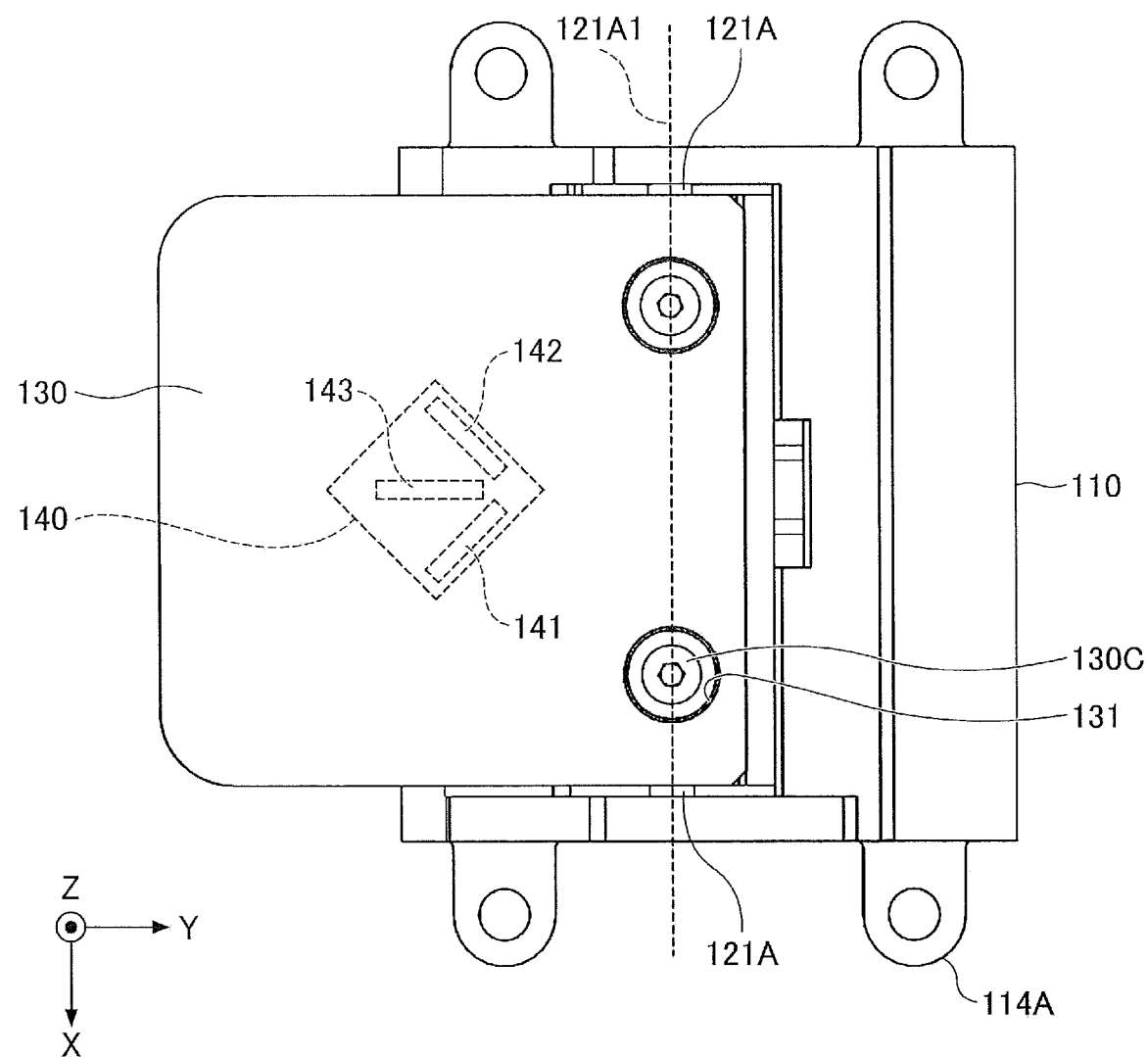
FIG. 4 is a top view illustrating the input device 100 according to one embodiment.
Figure 5:
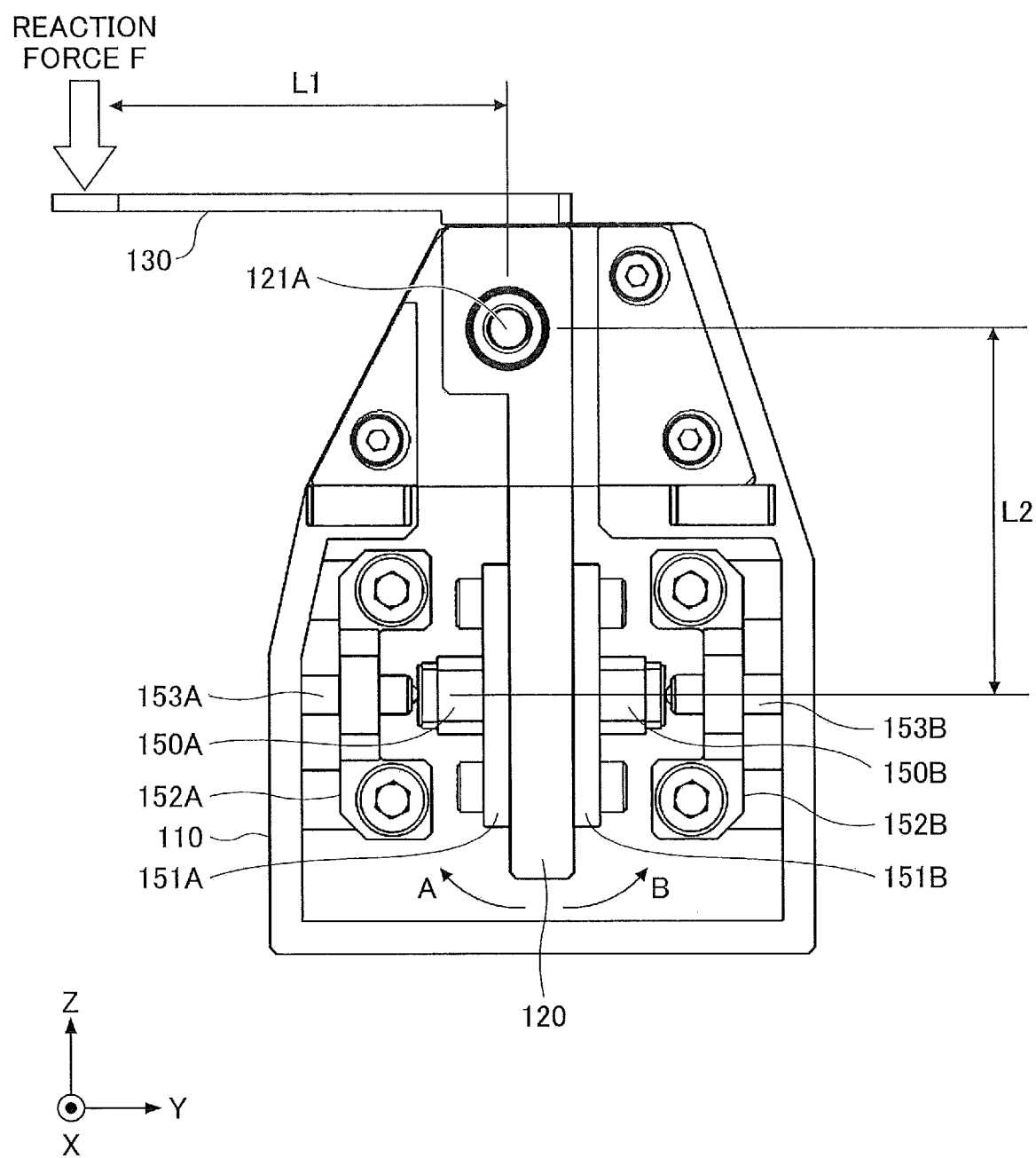
FIG. 5 is a side view illustrating the input device 100 according to one embodiment.

In the following, a description will be given in conjunction with FIG. 3 through FIG. 5, in addition to FIG. 2. FIG. 3 is an exploded view illustrating the input device 100 according to one embodiment, FIG. 4 is a top view illustrating the input device 100 according to one embodiment, and FIG. 5 is a side view illustrating the input device 100 according to one embodiment.

The housing 110 includes a body portion 110A, and the wall 110B. The housing 110 is made of a resin, for example. The body portion 110A has a generally parallelepiped shape with an upper portion having a shaped constricted toward the Y-axis direction, and includes an accommodating portion 110A1 for accommodating the lever 120. The housing 110 is an example of a fixing member. The housing 110 is fixed inside the main body 51 of the operation unit 50 of FIG. 1.

The body portion 110A includes a lower surface side (−Z-direction side) wall, a −X-direction side wall, and ±Y-direction side walls, surrounding the accommodating portion 110A1, and continuously open on the +X-direction side and the +Z-direction side. The body portion 110A also includes a bearing portion 111A, a fixing portion 112A, threaded holes 113A, and a fixing portion 114A.

The bearing portion 111A is provided on an upper portion of the surface of the −X-direction side wall facing the +X-direction, and rotatably supports a rotating shaft 121A on the −X direction side of the lever 120.

The fixing portion 112A is provided on surface of the −Y-direction side wall facing the +Y-direction, and the surface of the +Y-direction side wall facing the −Y-direction, and includes a threaded hole. The fixing portion 112A is provided to fix the holders 152A and 152B by screws.

The threaded holes 113A are provided at three positions in the wall of the body portion 110A facing the opening on the +X-direction side of the body portion 110A, and the wall 110B is fixed by three screws 110C.

The fixing portion 114A includes four protrusions protruding in the ±X-directions at an intermediate position along the height direction of the body portion 110A, and each of the four protrusions includes a through hole penetrating each protrusion in the Z-axis direction. The fixing portion 114A is provided for inserting screws or pins when fixing the operation unit to the center console 13 of the vehicle 10, as illustrated in FIG. 1 as an example.

The wall 110B is a plate member having a trapezoidal shape in a view perpendicular to a YZ-plane, and includes a bearing portion similar to the bearing portion 111A provided on a surface facing in the −X-direction.

The body portion 110A and the wall 110B are fixed by the screws 110C in a state where the lever 120 is accommodated in the accommodating portion 110A1, the rotating shaft 121A on the −X-direction side is inserted into the bearing portion 111A, and a rotating shaft 121A on the +X-direction side is inserted into the bearing portion of the wall 110B, so that the housing 110 rotatably holds the lever 120.

The lever 120 includes a base 121, and an extending portion 122. The lever 120 is made of a resin, for example. The base 121 is a member having a parallelepiped shape extending in the X-axis direction, and includes the rotating shafts 121A which protrude from surfaces facing the ±X-directions. The lever 120 is an example of a movable member.

In addition, two threaded holes 121B are provided in the surface of the base 121 facing the +Z-direction. Centers of the threaded holes 121B in a plan view are located at positions directly above the two rotating shafts 121A. A knob 130 is fixed to the threaded holes 121B by screws 130C. The extending portion 122 is integrally formed on the −Z-direction side of the base 121.

When the lever 120 is rotated clockwise about the rotating shafts 121A (in a direction of an arrow A in FIG. 5) when viewed from the +X-direction, the push switch 150A makes contact with the pin 153A. When the lever 120 is rotated counterclockwise about the rotating shafts 121A (in a direction of an arrow B in FIG. 5), the push switch 150B makes contact with the pin 153B. The clockwise rotation and the counterclockwise rotation are examples of rotations in a first rotating direction and a second rotating direction, respectively.

The knob 130 is a thin plate member having a rectangular shape in the plan view, and is made of a resin, for example. The knob 130 is an example of a manipulating part. The flex sensor 140 is provided on the lower surface of the knob 130. The knob 130 is a member that is manipulated by the user who performs an input operation to the input device 100. The knob 130 has the threaded hole 131 at the +X direction end on the side facing the +Y-direction, and at the −X-direction end on the side facing the +Y direction. Centers of the threaded holes 131 are located at positions directly above the two rotating shafts 121A.

In addition, corners at ends of the knob 130 along the ±X-directions, on the side facing the −Y-direction, are chamfered and curved in the plan view. The knob 130 is fixed to the upper end of the lever 120, by fastening the screws 130C inserted through the threaded holes 131 into the threaded holes 121B of the lever 120. Accordingly, in the direction in which the lever 120 extends from the rotating shafts 121A (in the Z-axis direction in a state where the lever 120 is not rotated), the knob 130 is provided on the +Z-direction side of the rotating shafts 121A. The +Z-direction side of the rotating shafts 121A is an example of a first side.

A knob 52 illustrated in FIG. 1 is fixed to the knob 130. The knob 52 is fixed to the knob 130 by fitting, fastening screw, bonding, or the like, and operates integrally with the knob 130.

Because the +Y-direction side of the knob 130 is fastened to the lever 120 by screws, a portion of the knob 130, which is closer to the −Y-direction side than a portion of the knob 130 in contact with the lever 120, is deformed by flexing when pressed by a user's hand or the like. The knob 130 is manipulated by applying a force to the left side (+X side) of the portion of the knob 130 closer to the −Y-direction side than the portion of the knob 130 in contact with the lever 120, to flex upward or downward, or to the right side (−X side) of the portion of the knob 130 closer to the −Y-direction side than the portion of the knob 130 in contact with the lever 120, to flex upward or downward.

The left side of the knob 130 is a first direction side along an axial direction (X-axis direction) of the rotating shafts 121A, and the right side of the knob 130 is a second direction side. In this case, the first direction is the +X-direction, and the second direction is the −X-direction.

Hence, when the force is applied to the knob 130 (knob 130 is pressed), the lever 120 rotates clockwise or counterclockwise about the rotating shafts 121A when viewed from the +X-direction, and the push switch 150A makes contact with the pin 153A, or the push switch 150B makes contact with the pin 153B.

In this state, the lever 120 and the knob 130 operate as levers. A fulcrum is the rotating shafts 121A. A point of effort is a point of the knob 130 touched by the user's hand or the like. A point of load is a pressing point of the push switches 150A and 150B which are mounted on the lever 120 via the substrates 151A and 151B. The pressing point of the push switches 150A and 150B may be the point of the push switches 150A and 150B pressed directly or indirectly by the rotating operation of lever 120.

For this reason, the pressing point of the push switches 150A and 150B may be the point where the pins 153A and 153B make contact with surfaces of the push switches 150A and 150B which are mounted on the lever 120 via the substrates 151A and 151B. The pressing point of the push switches 150A and 150B may be point where the push switches 150A and 150B are mounted on the substrates 151A and 151B. In addition, the pressing point of the push switches 150A and 150B may be point where the substrates 151A and 151B, mounted with the push switches 150A and 150B, are mounted on the lever 120.

The flex sensor 140 is provided to detect the input manipulated direction of the knob 130, by detecting a flexing direction generated in the knob 130. The flex sensor 140 is illustrated in a simplified manner in FIG. 2 and FIG. 3, however, includes three sensor portions (sensors 141, 142, and 143) as more particularly illustrated in FIG. 4. The sensors 141 through 143 have an elongated sensor element shape in the plan view, and detect flexing (deformation) in a longitudinal direction.

As illustrated in FIG. 4, the sensor 143 is arranged so as to extend in the Y-axis direction (the longitudinal direction is parallel to the Y axis) at the center along the X-axis direction of the knob 130. The sensors 141 and 142 are provided in line symmetry, with respect to an axis of symmetry formed by a center line which extends in the Y-axis direction and passes a center of a width of the sensor 143 taken along the X-axis direction.

A center axis 121A1 of the rotating shafts 121A is indicated by a dashed line. The longitudinal direction of the sensors 141 and 142 forms an angle of 45 degrees with respect to the center axis 121A1 of the rotating shafts 121A, and the longitudinal direction of the sensor 143 forms an angle of 90 degrees with respect to the center axis 121A1 of the rotating shafts 121A. In other words, the sensors 141, 143, and 142 extend in a 45-degree direction, a 90-degree direction, and a 135-degree direction with respect to the center axis 121A1 of rotating shafts 121A, respectively.

The push switches 150A and 150B are switches capable of switching between electrically on (conducting) and off (non-conducting) states, and are provided in triplicate, respectively. Three push switches 150A and three push switches 150B are provided, in order to adjust an operating load of the knob 130 to a desired load. The push switches 150A and 150B are examples of switches.

In relation to the position of the lever 120, in a direction in which the lever 120 extends from the rotating shafts 121A (in the Z-axis direction in a state where the lever 120 is not rotated), the push switches 150A and 150B are provided on the −Z-direction side of the rotating shafts 121A. The −Z-direction side of the rotating shafts 121A is an example of a second side.

Three push switches 150A are mounted on the surface of the substrate 151A facing the −Y-direction. The substrate 151A is fastened by screws to the surface of the extending portion 122 of the lever 120, facing the −Y-direction, by inserting screws 151A2 into through holes 151A1. The three push switches 150A are arranged in the X-axis direction at the same height position. The push switches 150A are an example of a first switch part.

The push switch 150A has a built-in spring, and switches from an off state to an on state when a predetermined pressing force is applied to release the spring. The push switch 150A is a normally-open switch that is held in the on state while being pressed in the on state, and switches to the off state when no longer pressed.

A normally-closed switch may be used for the push switch 150A, in place of the normally-open switch. In this case, the switch is held in the off state while being pressed, and switches to the on state when no longer pressed.

The push switch 150A switches from the off state to the on state when the predetermined pressing force is applied to release the spring, and the pressing force required to hold the push switch 150A in the pressed state rapidly decreases. The push switch 150A of this type can provide a sense of click to the user's hand or the like manipulating the knob 130.

Similar to the push switches 150A, the push switches 150B are switches capable of switching between electrically on (conducting) and off (non-conducting) states, and three push switches 150B are provided on the surface of the substrate 151B casing the +Y-direction. The push switches 150B are an example of a second switch part.

The push switch 150B is a normally-open switch, similar to the push switch 150A, however, a normally-closed switch may be used in place of the normally-open switch. In this case, the switch is held in the off state while being pressed, and switches to the on state when no longer pressed.

The substrate 151B is fixed to the surface of the extending portion 122 of the lever 120, facing the +Y-direction, by fastening screws 151B2 inserted into through holes 151B1. The three push switches 150B are arranged along the X-axis direction at the same height position. Similar to the push switch 150A, the push switch 150B can provide a sense of click to the user's hand or the like manipulating the knob 130.

The holder 152A is a member that is held by inserting three pins 153A therethrough, and is fixed in a state where the pins 153A are inserted into three through holes 152A1. The pin 153A may be fixed in the through hole 152A1 by fitting, bonding, or the like.

The holder 152A has through holes 152A2 that penetrate protrusions, protruding in the ±Z-direction, in the X-axis direction, and is fixed to the body portion 110A by fastening screws 155 inserted into through hole 152A2 to the fixing portion 112A of the body portion 110A.

The positions of the three pins 153A are aligned to the positions of the three push switches 150A. The three pins 153A press the push switches 150A when the knob 130 is manipulated and the lever 120 rotates in the direction of the arrow A illustrated in FIG. 5. The push switches 150A act as spring members for restricting the rotation of the lever 120 until a predetermined pressing force is applied.

The holder 152B is a member that is held by inserting three pins 153B therethrough, and is fixed in a state where the pins 153B are inserted into three through holes 152B1. The holder 152B has through holes 152B2 that penetrate protrusions, protruding in the ±Z-direction, in the X-axis direction. The holder 152B is fixed to the body portion 110A by fastening screws 155 inserted into through hole 152B2 to a fixing portion (fixing portion similar to the fixing portion 112A) of the body portion 110A.

The positions of the three pins 153B are aligned to the positions of the three push switches 150B. The three pins 153B press the push switches 150B when the knob 130 is manipulated and the lever 120 rotates in the direction of the arrow B illustrated in FIG. 5. The push switches 150B act as spring members for restricting the rotation of the lever 120 until a predetermined pressing force is applied.

Figure 6:
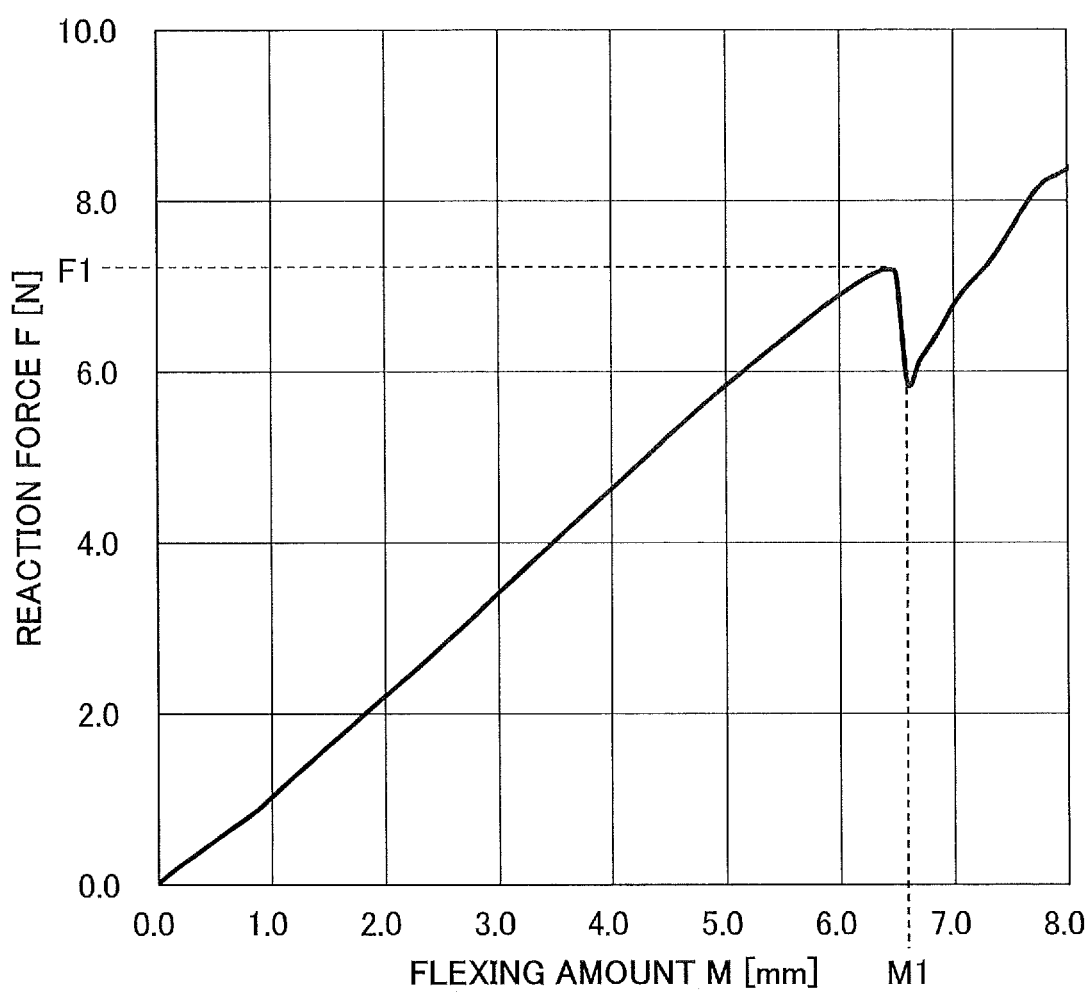
FIG. 6 is a diagram illustrating characteristics of a reaction force with respect to a flexing amount of a knob 130.

FIG. 6 is a diagram illustrating characteristics of a reaction force with respect to a flexing amount of the knob 130. The knob 130 can be deformed, when a portion of the knob 130, which is closer to the −Y-direction side than the portion in contact with the lever 120, flexes. When the user applies a force on the knob 130 by the hand or the like to deform the knob 130 in the manner described above, a reaction force is applied to the user's hand or the like. This reaction force is the operating load of the knob 130.

A flexing amount of the knob 130 in the Z-axis direction is a stroke of the knob 130 of the input device 100, and indicates a stroke of the end of the knob 130 facing the Y-direction stroke along the Z-direction. The reaction force is a reaction force of the knob 130 acting on the user's hand or the like, and is an actuation force required to actuate the push switches 150A and 150B by manipulating the knob 130.

The knob 130 and the push switches 150A and 150B may be regarded as springs, and a spring constant may be denoted by k. The knob 130 and the push switches 150A and 150B are designed, so that a reaction force F becomes a target value F1 when a flexing amount M of the knob 130 reaches a target value M1, and the springs of the push switches 150A and 150B are released to provide the sense of click.

As illustrated in FIG. 5, if a distance from a center of the rotating shafts 121A on the XZ-plane to a position (manipulating position) where the knob 130 is manipulated is denoted by L1, a distance from the center of the rotating shafts 121A to a center of the switches 150A and 150B is denoted by L2, and a pressing force required to release the springs of the switches 150A and 150B is denoted by Fs, the reaction force F that can provide the sense of click can be expressed by the following formula (1).

$$F = L2/L1 \times Fs \tag{1}$$

The flexing amount M of the knob 130 at the manipulating position in this state can be expressed by the following formula (2).

$$M = F/k = Fs/k \times L2/L1 \tag{2}$$

As illustrated in FIG. 6, when the flexing amount M of the knob 130 increases, the reaction force F also increases, and when the flexing amount M reaches the target value M1, the springs of the push switches 150A and 150B are released, so that the reaction force decreases slightly. At this point in time, the push switches 150A and 150B are in a state (completely squeezed state) where the push switches 150A and 150B cannot be pressed further. Hence, because the springs of the push switches 150A and 150B are released to slightly decrease the reaction force, it is possible to provide the sense of click to the user's hand or the like touching the knob 130. By setting a stiffness of knob 130 and the pressing force Fs on the push switches 150A and 150B to suitable values, it is possible to provide a desired sense of click.

However, in this case, it is necessary to set the material and the size (lengths in the X-axis and Y-axis directions, a thickness in the Z-axis direction, or the like) of the knob 130, so that the sense of click can be provided in an operating range less than or equal to a yield stress of the knob 130.

Figure 7:
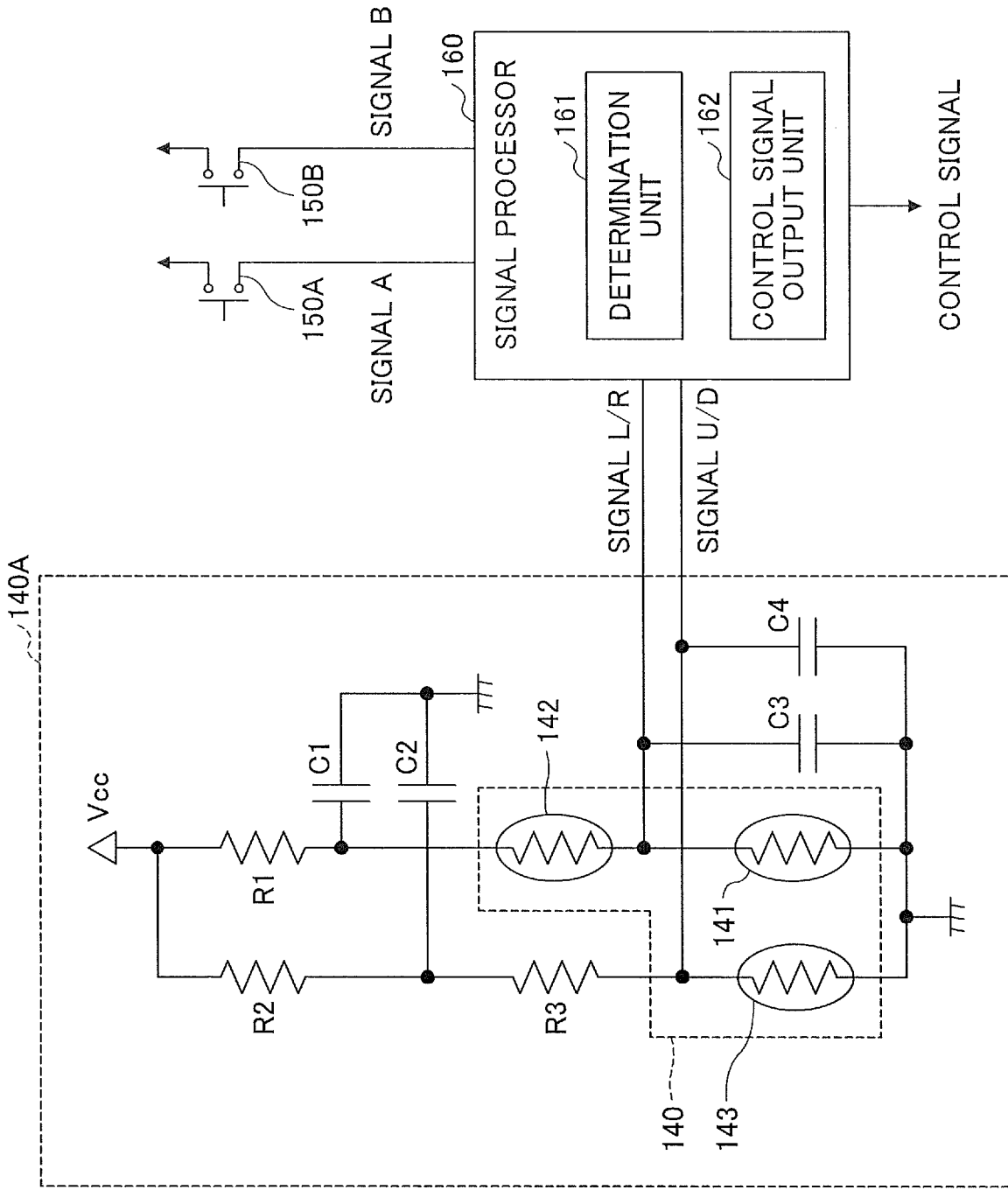
FIG. 7 is a diagram illustrating a circuit of the input device 100.

FIG. 7 is a diagram illustrating a circuit of the input device 100. The input device 100 includes a sensor circuit 140A, and in the sensor circuit 140A, the sensors 141 and 142 of the flex sensor 140 and a resistor R1 are connected in series between a power supply Vcc and ground. In addition, the sensor 143 and resistors R2 and R3 are connected in series between the power supply Vcc and the ground. Further, capacitors C1 through C4 are provided at positions illustrated in FIG. 7.

Moreover, the input device 100 includes a signal processor 160. The signal processor 160 includes an information processor, such as a microcomputer, and an Analog-to-Digital Converter (ADC). FIG. 7 illustrates a determination unit 161 and a control signal output unit 162 which are formed by the information processor of the signal processor 160. The determination unit 161 and the control signal output unit 162 represent functional blocks of the information processor of the signal processor 160.

A signal L/R indicating a voltage value of a node between the sensors 141 and 142, a signal U/D indicating a voltage value of a node between the resistor R3 and the sensor 143, and signals A and B indicating on and off states of the push switches 150A and 150B, are input to the signal processor 160. The signal L/R and the signal U/D are an example of first output signals.

The signal L/R is a signal indicating whether the input operation to the knob 130 is performed in the leftward (left) direction or the rightward (right) direction. In addition, the signal U/D is a signal indicating whether the input operation to the knob 130 is performed in the upward (up) direction or the downward (down) direction.

The signal L/R and the signal U/D are subjected to analog-to-digital (A/D) conversion before being input to the determination unit 161. Based on the A/D converted signals L/R and U/D, the determination unit 161 determines the direction in which the knob 130 is manipulated, from among an upper left direction, a lower left direction, an upper right direction, and a lower right direction.

In addition, the determination unit 161 detects the on and off states of the push switches 150A and 150B, based on the signals A and B. The signals A and B are an example of second output signals.

The control signal output unit 162 outputs a control signal indicating a determination result of the manipulated direction of the knob 130, and a determination result of the on and off states of the push switches 150A and 150B. Further, the control signal output unit 162 outputs a magnitude of both or one of the first output signals, namely, the signal L/R and the signal U/D, as the A/D converted digital value for the control signal.

FIG. 8 is a diagram illustrating the manipulated direction of the knob 130 determined by the signal L/R and the signal U/D. In FIG. 8, the abscissa indicates a signal level (voltage value) of the signal L/R, and the higher the signal level of the signal L/R becomes towards the right side of the abscissa. The ordinate indicates a signal level (voltage value) of the signal U/D, and the higher the signal level of the signal. U/D becomes towards the upper side of the ordinate.

The signal L/R has a property such that the signal level increases when the left side of the knob 130 is manipulated in the upward direction and flexes, and when the right side of the knob 130 is manipulated in the downward direction and flexes, and the signal level decreases when the left side of the knob 130 is manipulated in the downward direction and flexes, and when the right side of the knob 130 is manipulated in the upward direction and flexes.

Moreover, the signal U/D has a property such that the signal level increases when the left side of the knob 130 is manipulated in the upward direction and flexes, and when the right side of the knob 130 is manipulated in the upward direction and flexes, and the signal level decreases when the left side of the knob 130 is manipulated in the downward direction and flexes, and when the right side of the knob 130 is manipulated in the downward direction and flexes.

For this reason, when the signal L/R is plotted on the abscissa and the signal U/D is plotted on the ordinate, as illustrated in FIG. 8, the distributions of the signal levels of the signal L/R and the signal U/D become as illustrated in FIG. 8 when the knob 130 is manipulated toward the upper right, the upper left, the lower right, or the lower left.

In FIG. 8, a no-operation region is a region where the determination unit 161 of the signal processor 160 determines that the knob 130 is not manipulated, and is set to a cross-shaped portion at center portions of the signal levels of the signal L/R and the signal U/D, as indicated by a dashed line. A voltage value of the signal L/R at the center of the no-operation region is Vc, a voltage value of the signal L/R at a lower limit of the no-operation region is V1, and a voltage value of the signal L/R at an upper limit of the no-operation region is V2. A voltage value of the signal U/D at the center of the no-operation region is Vm, a voltage value of the signal U/D at the lower limit of the no-operation region is V3, and a voltage value of the signal U/D at the upper limit of the no-operation region is V4. The no-operation region is a region where at least one of the signal L/R in a range higher than or equal to V1 and lower than or equal to V2, and the signal U/D in a range higher than or equal to V3 and lower than or equal to V4, is satisfied.

If the signal L/R is lower than the lower limit voltage V1 of the no-operation region, the determination unit 161 determines that the knob is manipulated toward the upper right or the lower left, and if the signal L/R is higher than the upper limit voltage V2 of the no-operation region, the determination unit 161 determines that the knob is manipulated toward the upper left or the lower right.

In addition, if the signal U/D is lower than the lower limit voltage V3 of the no-operation region, the determination unit 161 determines that the knob is manipulated in toward the lower left or the lower right, and if the signal U/D is higher than the upper limit voltage V4 of the no-operation region, the determination unit 161 determines that the knob is manipulated toward the upper right or the upper left.

Figure 9A:
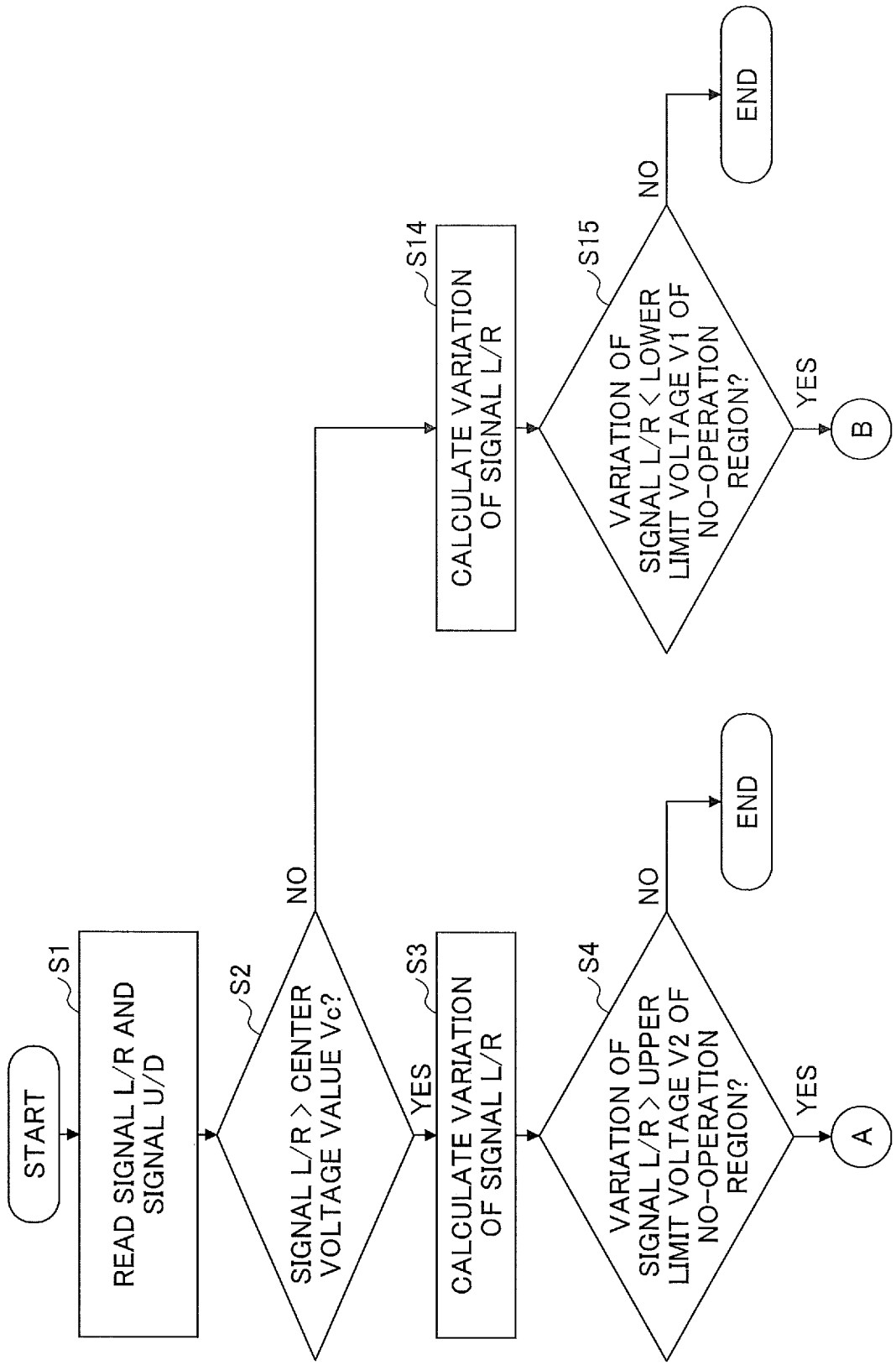
FIG. 9A is a flow chart illustrating a process of a determination unit 161 of the signal processor 160, determining the manipulated direction of the knob 130.
Figure 9C:
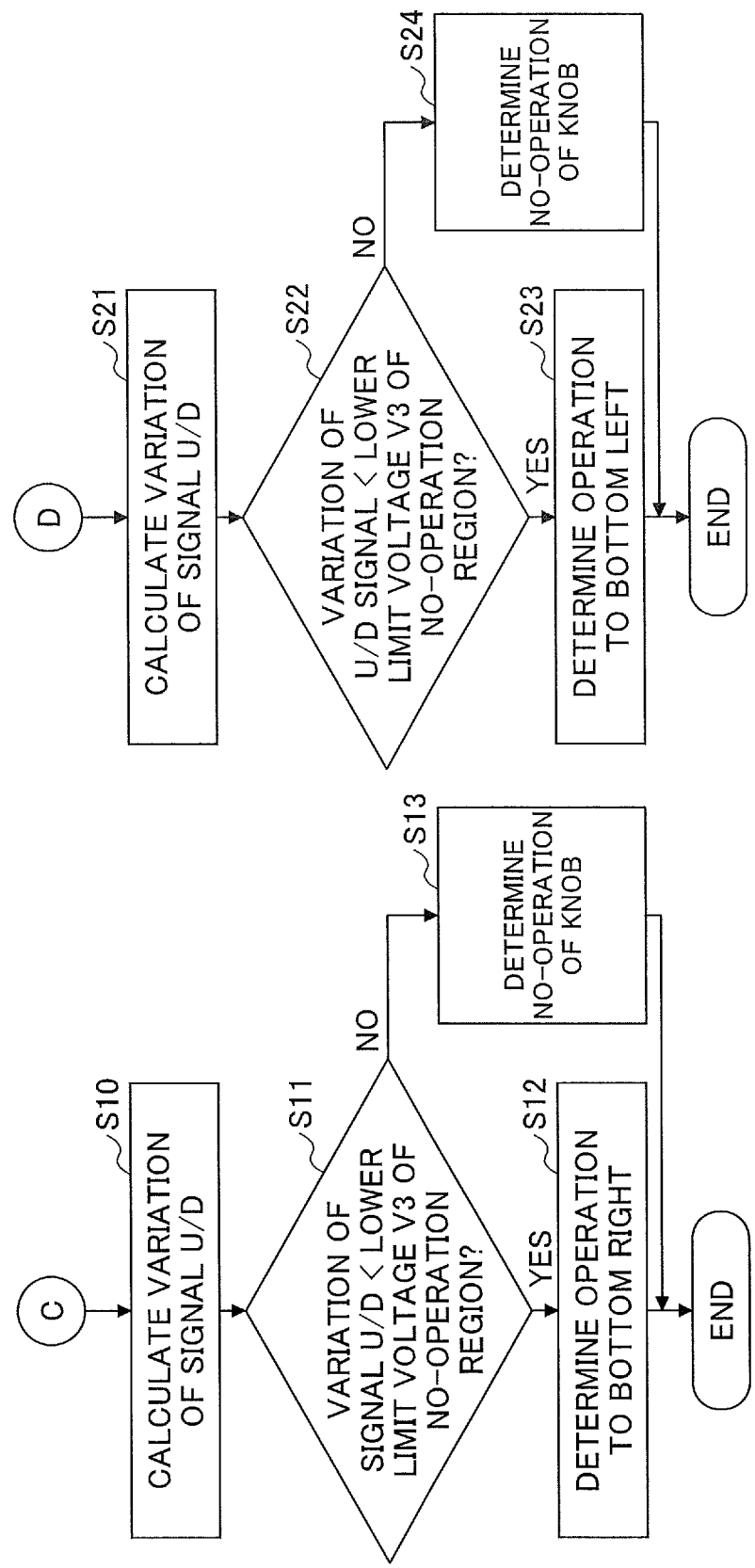
FIG. 9C is a flow chart illustrating the process of the determination unit 161 of the signal processor 160, determining the manipulated direction of the knob 130.

FIG. 9A through FIG. 9C are flow charts illustrating a process of the determination unit 161 of the signal processor 160, determining the manipulated direction of the knob 130. The determination unit 161 stores a signal level (a center voltage value Vc of the no-operation region) of the signal L/R and the signal U/D, in a state where the knob 130 is not manipulated.

The determination unit 161 reads the signal L/R and the signal U/D (step S1).

The determination unit 161 determines whether or not the signal L/R is greater than the center voltage value Vc (step S2). A case where the signal L/R is greater than the center voltage value Vc, corresponds to a state where the knob 130 is manipulated toward the upper left or the lower right.

If the determination unit 161 determines that the signal L/R is greater than the center voltage value Vc (YES in S2), the determination unit 161 calculates a variation of the signal L/R (step S3). This variation of the signal L/R is a difference of the level of the signal L/R calculated in step S3 of the current control cycle, with respect to the level of the signal L/R calculated in step S3 of the previous control cycle.

The determination unit 161 determines whether or not the variation of the signal L/R is greater than the upper limit voltage V2 of the no-operation region (step S4).

If the determination unit 161 determines that the variation of the signal L/R is greater than the upper limit voltage V2 of the no-operation region (YES in S4), the determination unit 161 determines whether or not the signal U/D is greater than the center voltage value Vm (step S5). A case where the signal U/D is greater than the center voltage value Vm, corresponds to a state where the knob 130 is manipulated toward the upper right or the upper left.

If the determination unit 161 determines that the signal U/D is greater than the center voltage value Vm (YES in S5), the determination unit 161 calculates a variation of the signal U/D (step S6). This variation of the signal U/D is a difference of the level of the signal U/D calculated in step S6 of the current control cycle, with respect to the level of the signal U/D calculated in step S6 of the previous control cycle.

The determination unit 161 determines whether or not the variation of the signal U/D is greater than the upper limit voltage V4 of the no-operation region (step S7).

If the determination unit 161 determines that the variation of the signal U/D is greater than the upper limit voltage V4 of the no-operation region (YES in S7), the determination unit 161 determines that the knob 130 is manipulated toward the upper left (step S8).

In addition, if the determination unit 161 determines in step S7 that the variation of the signal U/D is not greater than the upper limit voltage V4 of the no-operation region (NO in S7), the determination unit 161 determines that the knob 130 is not manipulated (step S9).

Moreover, if the determination unit 161 determines in step S4 that the variation of the signal L/R is not greater than the upper limit voltage V2 of the no-operation region (No in S4), the determination unit 161 ends the process (end).

Further, if the determination unit 161 determines in step S5 that the signal U/D is not greater than the center voltage value Vc (No in S5), the determination unit 161 calculates a variation of the signal U/D (step S10). This variation of the signal U/D is a difference of the level of the signal U/D calculated in step S10 of the current control cycle, with respect to the level of the signal U/D calculated in step S10 of the previous control cycle.

The determination unit 161 determines whether or not the variation of the signal U/D is less than the lower limit voltage V3 of the no-operation region (step S11).

If the determination unit 161 determines that the variation of the signal U/D is less than the lower limit voltage V3 of the no-operation region (YES in S11), the determination unit 161 determines that the knob 130 is manipulated toward the lower right (step S12).

In addition, if the determination unit 161 determines in step S11 that the variation of the signal U/D is not less than the lower limit voltage V3 of the no-operation region (No in S11), the determination unit 161 determines that the knob 130 is not manipulated (step S13).

Moreover, if the determination unit 161 determines that the signal L/R is not greater than the center voltage value Vc (NO in S2), the determination unit 161 calculates a variation of the signal L/R (step S14). This variation of the signal L/R is a difference of the level of the signal L/R calculated in step S14 of the current control cycle, with respect to the level of the signal L/R calculated in step S14 of the previous control cycle.

The determination unit 161 determines whether or not the variation of the signal L/R is less than the lower limit voltage V1 of the no-operation region (step S15).

If the determination unit 161 determines that the variation of the signal L/R is less than the lower limit voltage V1 of the no-operation region (YES in S15), the determination unit 161 determines whether or not the signal U/D is greater than the center voltage value Vm (step S16). A case where the signal U/D is greater than the center voltage value Vm, corresponds to a state where the knob 130 is manipulated toward the upper right or the upper left.

If the determination unit 161 determines that the signal U/D is greater than the center voltage value Vm (YES in S16), the determination unit 161 calculates a variation of the signal U/D (step S17). This variation of the signal U/D is a difference of the level of the signal U/D calculated in step S17 of the current control cycle, with respect to the level of the signal U/D calculated in step S17 of the previous control cycle.

The determination unit 161 determines whether or not the variation of the signal U/D is greater than the upper limit voltage V4 of the no-operation region (step S18).

If the determination unit 161 determines that the variation of the signal U/D is greater than the upper limit voltage V4 of the no-operation region (YES in S18), the determination unit 161 determines that the knob 130 is manipulated toward the upper right (step S19).

In addition, if the determination unit 161 determines in step S18 that the variation of the signal U/D is not greater than the upper limit voltage V4 of the no-operation region (NO in S18), the determination unit 161 determines that the knob 130 is not manipulated (step S20).

Moreover, if the determination unit 161 determines in step S15 that the variation of the signal L/R is not greater than the lower limit voltage V1 of the no-operation region (NO in S15), the determination unit 161 ends the process (end).

Further, if the determination unit 161 determines in step S16 that the signal U/D is not greater than the center voltage value Vm (NO in S16), the determination unit 161 calculates a variation of the signal U/D (step S21). This variation of the signal U/D is a difference of the level of the signal U/D calculated in step S21 of the current control cycle, with respect to the level of the signal U/D calculated in step S21 of the previous control cycle.

The determination unit 161 determines whether or not the variation of the signal U/D is smaller than the lower limit voltage V3 of the no-operation region (step S22).

If the determination unit 161 determines that the variation of the signal U/D is less than the lower limit voltage V3 of the non-operation region (YES in S22), the determination unit 161 determines that the knob 130 is manipulated toward the lower left (step S23).

In addition, if the determination unit 161 determines in step S22 that the variation of the signal U/D is not less than the lower limit voltage V3 in the no-operation region (NO in S22), the determination unit 161 determines that the knob 130 is not manipulated (step S24).

Figure 10A:
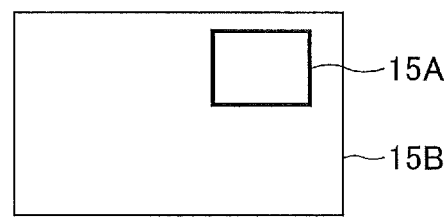
FIG. 10A is a diagram illustrating an operation example based on a control signal output from the signal processor 160.
Figure 10B:
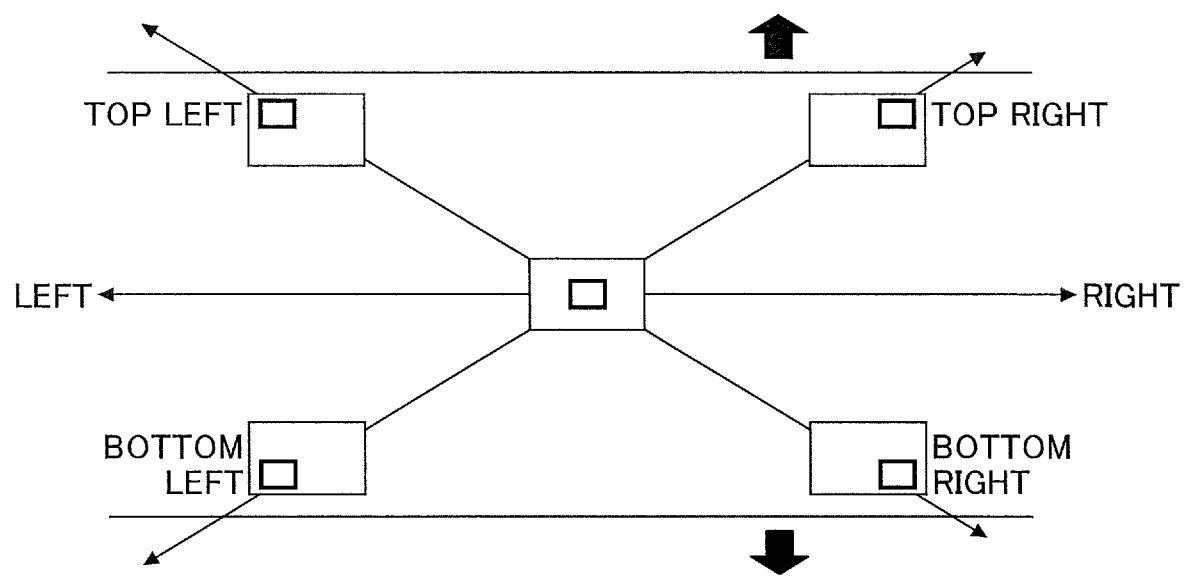
FIG. 10B is a diagram illustrating the operation example based on the control signal output from the signal processor 160.

FIG. 10A and FIG. 10B are diagrams illustrating an operation example based on the control signal output from the signal processor 160. As an example, an operation example in which the vehicle 10 (refer to FIG. 1) is equipped with a camera configured to acquire the rear image, and a display, which is provided in place of the inner mirror 15, and is configured to display the rear image captured by the camera, and a range to be displayed on the display is adjusted by the input device 100, will be described.

FIG. 10A illustrates a visual field 15A displayable on the display, and a movable range 15B of the visual field 15A. Because the determination unit 161 performs the process illustrated in FIG. 9A through FIG. 9C, and can determine whether the input operation to the knob 130 is a manipulation in a direction of one of the upper left direction, the lower left direction, the upper right direction, and the lower right direction, it is possible to move the visual field 15A within the movable range 15B in the direction indicated by the determination result, as illustrated in FIG. 10B.

For example, if the visual field 15A is being moved in the direction of one of the upper left, the lower left, the upper right, and the lower right according to the manipulated direction of the knob 130, the position of the visual field 15A becomes fixed when the magnitudes of the first output signals are maintained in a constant state for a predetermined time. On the other hand, when the push switch 150A or 150B is turned on, the visual field 15A is adjusted to a preset position.

As described above, the input device 100 can determine whether the manipulated direction of the knob 130 is the direction toward the upper left, the lower left, the upper right, or the lower right, based on the signal L/R and the signal U/D obtained from the flex sensor 140. The input device 100 can also detect the on and off states of the push switches 150A and 150B. The input device 100 can also output the control signal according to the magnitudes of the first output signals.

Accordingly, it is possible to provide the input device 100 which outputs the control signal according to the manipulated direction and the manipulated amount, and the operation unit 50.

The push switches 150A and three push switches 150B are provided in the embodiment described above. However, at least one push switch 150A and at least one push switch 150B may be provided. In this case, the number of push switches 150A and the number of push switches 150B on both sides of the lever 120 are desirably the same, from a viewpoint of making the operating load of the knob 130 uniform in the upward and downward directions.

In addition, when a plurality of push switches 150A and a plurality of push switches 150B are provided, the plurality of push switches 150A except for one, and the plurality of push switches 150B except for one, may be dummy push switches which are merely used to generate a load and do not output an on or off signal. Alternatively, the load may be adjusted using an elastic member, such as a spring, rubber, or the like, in place of the dummy push switch.

Although the flex sensor 140 is used to detect the flexing of knob 130 in the embodiment described above, a sensor, which detects a displacement due to deformation of the knob 130, may be used instead of the flex sensor 140. For example, a piezoelectric element may be used for such a sensor.

The push switches 150A and 150B are fixed to the lever 120 through the substrates 151A and 151B in the embodiment described above. However, the push switches 150A and 150B may be mounted on the wall of the body portion 110A of the housing 110 facing the accommodating portion 110A1, and configured to be pressed by the pins 153A and 153B as the lever 120 rotates.

According to the embodiments of the present disclosure, it is possible to provide an input device and an operation unit, which output signals indicating a manipulated direction, and on and off states according to a manipulated amount.

Although preferable embodiments or the like are described in detail above, the present disclosure is not limited to the embodiments or the like described above, and various variations, modifications, and substitutions may be made to the embodiments or the like described above without departing from the scope of the present disclosure.

What is claimed is:

1. An input device comprising:
   an manipulating part;
   a movable member fixed to the manipulating part and having a rotating shaft;
   a fixing member configured to rotatably support the rotating shaft so that the movable member is rotatable;
   a flex sensor disposed on the manipulating part and configured to detect flexing of the manipulating part;
   a switch disposed on the movable member or the fixing member, pressed by a rotating operation of the movable member, and configured to switch between an on state and an off state when a flexing amount of the manipulating part reaches a predetermined amount; and
   a signal processor configured to output a control signal, based on a first output signal of the flex sensor, and a second output signal of the switch.

2. The input device as claimed in claim 1, wherein the switch includes
   a first switch part disposed adjacent to the movable member at a position closer to the movable member along the first rotating direction, and
   a second switch part disposed adjacent to the movable member at a position closer to the movable member along the second rotating direction,
   wherein the first switch part is switched to an on state when the manipulating part is manipulated in the first rotating direction of the movable member, and a flexing amount of the manipulating part reaches a predetermined amount, and
   wherein the second switch part is switched to an on state when the manipulating part is manipulated in the second rotating direction of the movable member, and the flexing amount of the manipulating part reaches a predetermined amount.

3. An operation unit disposed in an interior of a vehicle, and configured to operate a device of the vehicle, the operation unit comprising:
   the input device according to claim 1, accommodated inside the operation unit,
   wherein the signal processor outputs the control signal to the device in response to a manipulation of the manipulating part.

4. The input device as claimed in claim 1, wherein the manipulating part is fixed to a first side of the rotating shaft of the movable member, and wherein the switch is provided on a second side of the rotating shaft of the movable member.

5. The input device as claimed in claim 4, wherein the manipulating part and the movable member operate using the rotating shaft as a fulcrum, a pressing point of the switch as a point of load, and a manipulating point of the manipulating part as a point of effort.

6. The input device as claimed in claim 1, wherein the flex sensor has three sensor portions, respectively extending along 45-degree, 90-degree, and 135-degree directions with respect to an axial direction of the rotating shaft, and detecting flexing of the manipulating part along longitudinal directions thereof.

7. The input device as claimed in claim 6, wherein the signal processor determines, based on the first output signal, whether a manipulated direction of manipulating part is one of the first direction and the second direction along the axial direction of the rotating shaft, and is one of the first rotating direction and the second rotating direction of the movable member, and outputs the control signal including a determination result.

8. The input device as claimed in claim 6, wherein the manipulating part is fixed to a first side of the rotating shaft of the movable member, and wherein the switch is provided on a second side of the rotating shaft of the movable member.

9. The input device as claimed in claim 6, wherein the switch includes
   a first switch part disposed adjacent to the movable member at a position closer to the movable member along the first rotating direction, and
   a second switch part disposed adjacent to the movable member at a position closer to the movable member along the second rotating direction,
   wherein the first switch part is switched to an on state when the manipulating part is manipulated in the first rotating direction of the movable member, and a flexing amount of the manipulating part reaches a predetermined amount, and
   wherein the second switch part is switched to an on state when the manipulating part is manipulated in the second rotating direction of the movable member, and the flexing amount of the manipulating part reaches a predetermined amount.

10. An operation unit disposed in an interior of a vehicle, and configured to operate a device of the vehicle, the operation unit comprising:
    the input device according to claim 6, accommodated inside the operation unit,
    wherein the signal processor outputs the control signal to the device in response to a manipulation of the manipulating part.

11. The input device as claimed in claim 6, wherein the flex sensor has a sensor circuit part including the three sensor portions, and configured to output, as the first output signal, a signal indicating that a flexing direction of the manipulating part is a first direction or a second direction along the axial direction of the rotating shaft, and a signal indicating that the flexing direction of the manipulating part is a first rotating direction or a second rotating direction of the movable member.

12. The input device as claimed in claim 11, wherein the signal processor determines, based on the first output signal, whether a manipulated direction of manipulating part is one of the first direction and the second direction along the axial direction of the rotating shaft, and is one of the first rotating direction and the second rotating direction of the movable member, and outputs the control signal including a determination result.

13. The input device as claimed in claim 11, wherein the manipulating part is fixed to a first side of the rotating shaft of the movable member, and wherein the switch is provided on a second side of the rotating shaft of the movable member.

14. The input device as claimed in claim 11, wherein the switch includes
    a first switch part disposed adjacent to the movable member at a position closer to the movable member along the first rotating direction, and
    a second switch part disposed adjacent to the movable member at a position closer to the movable member along the second rotating direction,
    wherein the first switch part is switched to an on state when the manipulating part is manipulated in the first rotating direction of the movable member, and a flexing amount of the manipulating part reaches a predetermined amount, and wherein the second switch part is switched to an on state when the manipulating part is manipulated in the second rotating direction of the movable member, and the flexing amount of the manipulating part reaches a predetermined amount.

15. An operation unit disposed in an interior of a vehicle, and configured to operate a device of the vehicle, the operation unit comprising:
  the input device according to claim 11, accommodated inside the operation unit,
  wherein the signal processor outputs the control signal to the device in response to a manipulation of the manipulating part.

\* \* \* \* \*